(12) United States Patent
Komiya et al.

(10) Patent No.: US 7,157,866 B2
(45) Date of Patent: Jan. 2, 2007

(54) LIGHT EMITTING ELEMENT DRIVING DEVICE AND PORTABLE APPARATUS EQUIPPED WITH LIGHT EMITTING ELEMENTS

(75) Inventors: Kunihiro Komiya, Kyoto (JP); Atsushi Kitagawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 106 days.

(21) Appl. No.: 11/078,046

(22) Filed: Mar. 10, 2005

(65) Prior Publication Data
US 2005/0200312 A1 Sep. 15, 2005

(30) Foreign Application Priority Data
Mar. 15, 2004 (JP) ............................. 2004-072109

(51) Int. Cl.
*H05B 37/00* (2006.01)
*H01L 27/14* (2006.01)

(52) U.S. Cl. .................. 315/312; 315/323; 315/185 S; 362/800; 362/802; 362/806

(58) Field of Classification Search .................... None
See application file for complete search history.

(56) References Cited

U.S. PATENT DOCUMENTS

2004/0036418 A1* 2/2004 Rooke et al. ................. 315/77
2005/0088207 A1* 4/2005 Rader et al. ................ 327/109

FOREIGN PATENT DOCUMENTS

JP 2002-214677 7/2002

* cited by examiner

*Primary Examiner*—Tuyet Thi Vo
(74) *Attorney, Agent, or Firm*—Hogan & Hartson LLP

(57) ABSTRACT

A driving device for driving multiple (R-, G-, and B-) groups of LEDs operative at different voltages, utilizing a battery supplying a power supply voltage of a step-up voltage. Under normal operating conditions, R-LEDs are driven by the battery voltage, but G- and B-LEDs are driven by the step-up voltage. The battery voltage is monitored to ensure that all the LEDs are driven by the step-up voltage when the battery voltage has lowered below a predetermined level, thereby reducing the power loss by the LEDs while emitting light and extending the permissible range of the battery voltage.

17 Claims, 3 Drawing Sheets

LIGHT EMITTING ELEMENT DRIVING DEVICE AND PORTABLE APPARATUS EQUIPPED WITH LIGHT EMITTING ELEMENTS

FIELD OF THE INVENTION

This invention relates to a device for driving light emitting elements such as light emitting diodes (LEDs) operable at high voltage (the device hereinafter referred to as light emitting element driving device or simply driving device), and to a portable apparatus equipped with such light emitting elements.

BACKGROUND OF THE INVENTION

Light emitting elements such as LEDs are used as, for example, multicolor display elements of a cellular phone for displaying data received, back light sources of an LCD (liquid crystal display), or flash light sources of a camera. For these purposes, red (R), green (G), and blue (B) LEDs are often used simultaneously.

To activate an LED for emission of light, a driving voltage is required that amounts to a voltage drop across the LED for emission of a required amount of light plus a control voltage for controlling the driver that controls the luminance of the LED. In a case where LEDs of a portable apparatus for example are driven by a battery voltage, the battery voltage is stepped up to a high voltage by a step-up circuit.

It is noted that different operating voltages are required for LEDs of different colors. For example, a white, a green, and a blue LED requires an operating voltage in the range from about 3.5 to 4.0 V, but a red LED requires a lower operating voltage in the range from about 2.8 to 3.0 V.

When for example a battery having rated voltage of about 3 V is used to drive multicolor LEDs, the battery voltage is stepped up to a higher voltage to drive green and blue LEDs while the battery voltage is used to directly drive red LED, since green and blue LEDs have a higher operating voltage than the battery voltage while red LED have a lower operating voltage, as disclosed in Japanese Patent Application Laid Open 2002-214677.

However, such prior art system as disclosed in the literature cited above cannot operate a red LED when the battery voltage has lowered below the operating voltage of the LED. Thus, the usable range of battery voltage is limited by the operating voltage of a red LED, which presents a problem that for this reason the battery energy cannot be fully exploited.

SUMMARY OF THE INVENTION

It is, therefore, an object of the invention to provide a light emitting element driving device for operating multiple groups of light emitting elements operable at different operating voltages, utilizing a battery as a power source therefor.

It is another object of the invention to provide a portable apparatus equipped with such light emitting elements.

It is a still another object of the inventive to reduce the energy loss in the emission of light by different groups of light emitting elements.

It is a further object of the invention to broaden a limited range of a battery voltage for light emitting elements to a wider usable range.

In accordance with one aspect of the invention, there is provided a light emitting element driving device, comprising:

a step-up circuit for stepping up a given power supply voltage to generate a required step-up voltage at an output end of the step-up circuit (the output end referred to as step-up voltage output end);

a voltage switch circuit for selectively outputting the power supply voltage or step-up voltage at a switched voltage output end of the voltage switch circuit;

a first driver connectable in series with a first light emitting element group and connected between the switched voltage output end and a reference voltage node, the first driver controlled by a first instruction signal; and a second driver connectable in series with a second light emitting element group that results in a larger voltage drop than the first group and connected between the step-up voltage output end and the reference voltage node, the second driver controlled by a second instruction signal. The light emitting element driving device may further comprise a third driver connectable in series with a third light emitting element group that results in a larger voltage drop than the first group, and connected between the step-up voltage output end and the reference voltage node, the third driver controlled by a third instruction signal.

The first, second, and third groups of light emitting elements may be groups of red, green, and blue LEDs, respectively.

The voltage switch circuit may be configured to be automatically switched to output the power supply voltage when the power supply voltage exceeds a predetermined level but output the step-up voltage when the power supply voltage is less than the predetermined level.

Each of the first through third drivers may be a constant current driver that can be turned on and off by the first through third instruction signals, respectively, so as to provide controlled current.

The driving device may comprise a selection circuit adapted to receive at all times the voltages that are impressed on the second and third drivers but receive the voltage that is impressed on the first driver only when the step-up voltage is output from the voltage switch circuit, the selection circuit further adapted to selectively output as a detection voltage the lowest voltage received, whereby the step-up voltage generated by the step-up circuit is controlled so that the detection voltage becomes equal to the reference voltage.

In accordance with another aspect of the invention, there is provided a portable apparatus equipped with light emitting elements, the apparatus comprising:

a battery for providing a power supply voltage;

a first light emitting element group including LED of a first predetermined color;

a second light emitting element group including LED of a second predetermined color and resulting in a larger voltage drop than the first group;

a step-up circuit for stepping up the power supply voltage to generate at a step-up voltage output end thereof a predetermined step-up voltage;

a voltage switch circuit for selectively outputting one of the power supply voltage and the step-up voltage at a switched voltage output end of the voltage switch circuit;

a first driver connected in series with the first light emitting element group and connected, together with the first group, between the switched voltage output end and a reference voltage node, the first driver controlled by a first instruction signal; and a second driver connected in series with the second light emitting element group and connected, together with the second group, between the step-up voltage output end and the reference voltage node, the second driver controlled by a second instruction signal.

The first driver may have a driver circuit for red light emitting element while the second driver may have a driver circuit for green light emitting element and a driver circuit for blue light emitting element.

The inventive LED driving device is capable of driving different groups of LED having different operating voltages, wherein the group of LED having a low operating voltages (red LED) can be selectively driven by the battery voltage or by a higher voltage stepped up from the battery voltage. When the battery has sufficient power, the group of LED having a low operating voltage are driven directly by the battery voltage to minimize power loss. When the battery power has fallen below a predetermined level, all of the LED groups (red, green and blue LEDs) are automatically driven by the step-up voltage. This helps reduce energy loss by the driving device and extend the usable range of the battery voltage, so that the invention permits effective utilization of energy that remains in a normally non-usable battery.

In the inventive LED driving device, each group of the LED may be driven by a constant current driver. In this case, the lowest voltages impressed on the constant current drivers is selected by the selection circuit as the detection voltage to automatically regulate the step-up voltage in such a way that the voltages impressed on the constant current drivers are suppressed to minimum allowable levels. Therefore, the power loss by the driving device can be further reduced.

It would be appreciated that the detection voltage can be selected by the selection circuit without being influenced by the operation of the voltage switch circuit, since the lowest voltage (i.e. the voltage impressed on the constant current driver driving the lowest-voltage group of LED) is input to the selection circuit only when the step-up voltage is output from the voltage switch circuit.

DETAILED DESCRIPTION OF THE PREFERRED EMBODIMENT

An inventive light emitting element driving device and portable apparatus equipped with light emitting elements will now be described in detail by way of example with reference to the accompanying drawings.

Figure 1:
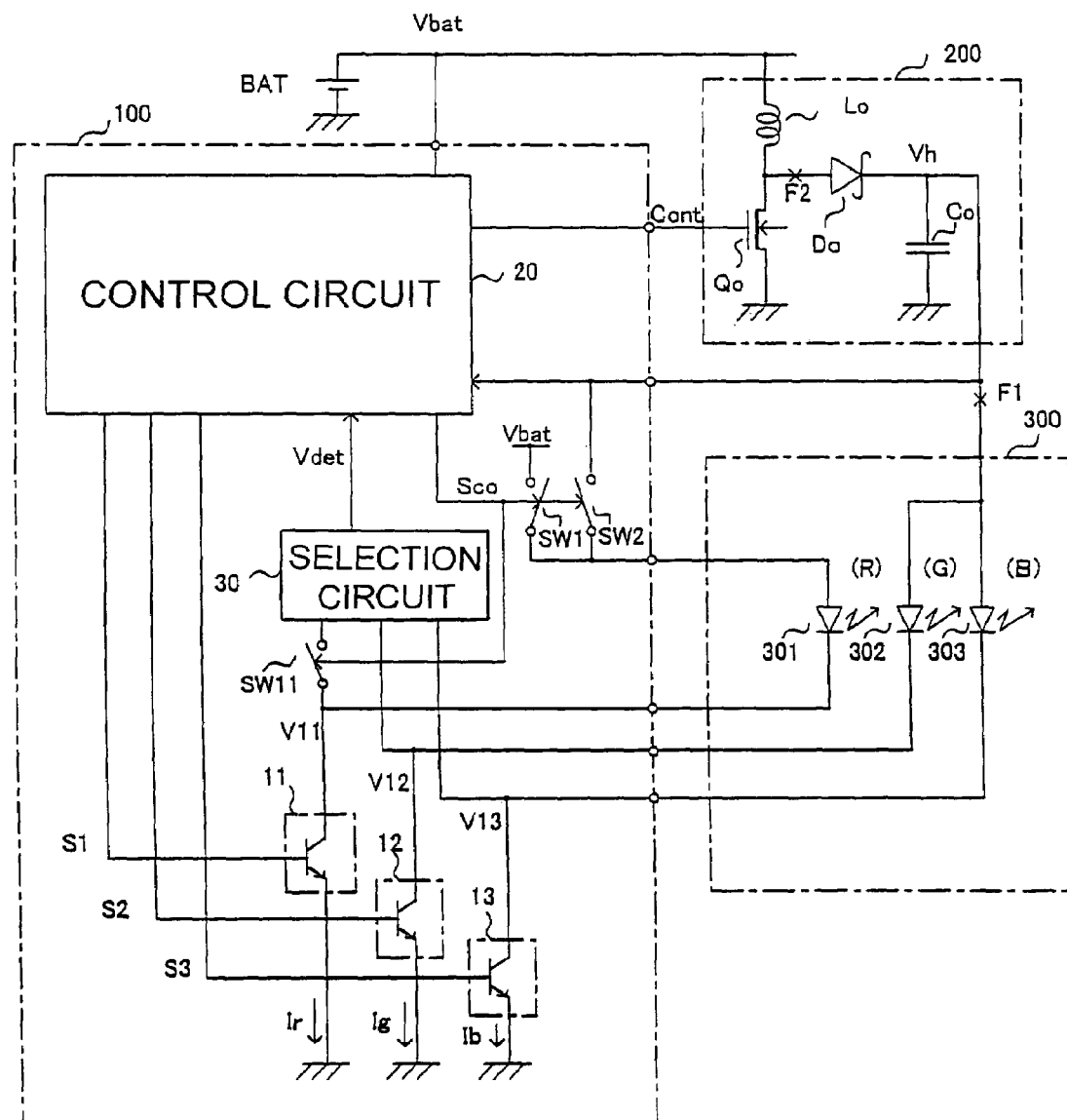
FIG. 1 is schematic diagram of a light emitting element driving device according to a first embodiment of the invention and a portable apparatus equipped with the inventive LED driving device.

Referring to FIG. 1, there is shown a light emitting element driving device, comprising a step-up circuit 200 for stepping up the power supply voltage Vbat of a battery BAT (normally having a nominal voltage of 3.6 V) to a required output voltage Vh, and a light emission control IC 100 for controlling the step-up circuit 200. The driving device also has a display 300 equipped with a first group 301 of light emitting elements, a second group 302 of light emitting elements, and a third group 303 of light emitting elements acting as loads connected to the step-up circuit 200. In the example shown herein, the first group 301, second group 302, and third group 303 of light emitting elements are red (R), green (G), and blue (B) LEDs, respectively. LED groups 301–303 may serve as, for example, light sources of a multicolor display and as backlight sources of a liquid crystal display.

The battery BAT can be a lithium ion battery or a nickel-cadmium battery. The power supply voltage Vbat of the battery BAT can be as high as 4.2 V when the battery is fully charged, and can become as low as 2.5 V as it is discharged. A typical power supply voltage is intermediate between 4.2 V and 2.5 V, e.g. 3.6 V.

The step-up circuit 200 includes a serially connected coil Lo and a switch Qo in the form of N-type MOS transistor (hereinafter referred to as N-type transistor), connected between the power supply voltage Vbat and the ground. The switch Qo is turned on/off by a switching control signal Cont supplied from the light emission control IC 100. The voltage appearing at the node of the coil Lo and the switch Qo is rectified and smoothed by a rectification diode Do and a smoothing capacitor Co, and is output as the step-up voltage Vh. The switch Qo can be a bipolar transistor. The rectification diode Do is preferably a Schottky barrier diode having a small forward voltage drop. In what follows the ground will be taken to be the zero point of voltage unless otherwise stated.

The red LED 301 of the display 300 is supplied with either the power supply voltage Vbat or the step-up voltage Vh as its driving voltage. On the other hand, the green LED 302 and blue LED 303 are supplied with the step-up voltage Vh as their driving voltage.

The light emission control IC 100 controls the step-up circuit 200 and the display 300. Connected in series to the respective LEDs 301–303 are first through third drivers 11–13. In order to regulate the amount of light emitted by the LEDs 301–303, the first through third drivers 11–13 respectively turn on/off currents Ir, Ig, and Ib to be supplied to the LEDs 301–303.

Figure 3:
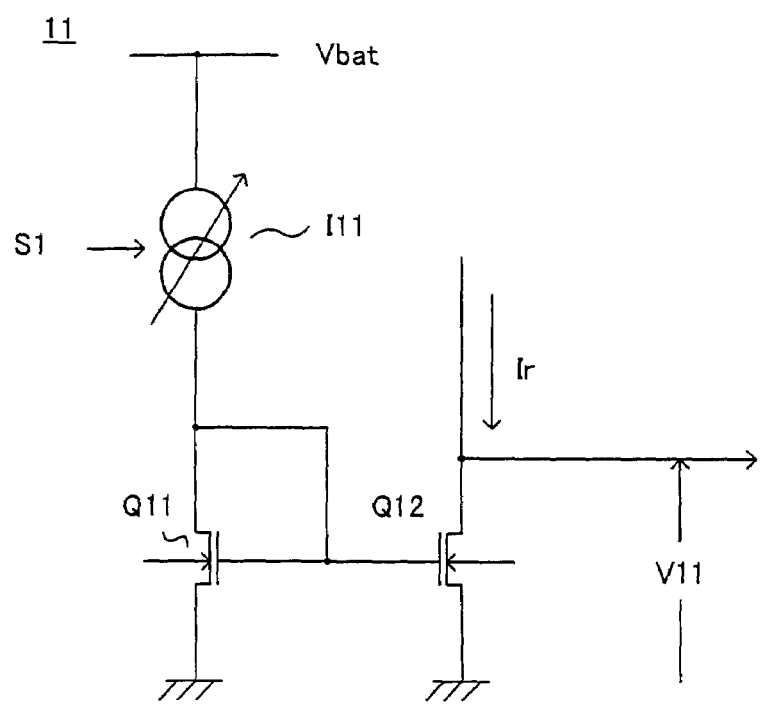
FIG. 3 is schematic diagram of a constant current driver for use in light emitting element driving device of FIG. 1.

The first through third drivers 11–13 are controlled by first through third command signal S1–S3, respectively, supplied from the control circuit 20. FIG. 3 shows an exemplary structure of the first driver 11. Other drivers 12 and 13 have substantially the same structure as the driver 11.

Connected in series between the power supply voltage Vbat and the ground as shown in FIG. 3 are a constant current circuit I11 and an N-type transistor Q11. The drain and the gate of the N-type transistor Q11 are directly connected with each other. A further N-type transistor Q12 having higher drive capability than the N-type transistor Q11 is provided to allow the drive current Ir to flow through the controller 11. The gate of the N-type transistor Q11 is connected to the gate of the N-type transistor Q12 to form a current mirror circuit.

As shown in FIG. 3, the magnitude of the drive current Ir flowing through the N-type transistor Q12 can be arbitrarily controlled by instructing the level of the current Ir by the instruction circuit S1 and controlling on/off operation of the constant current circuit I11.

Figure 2:
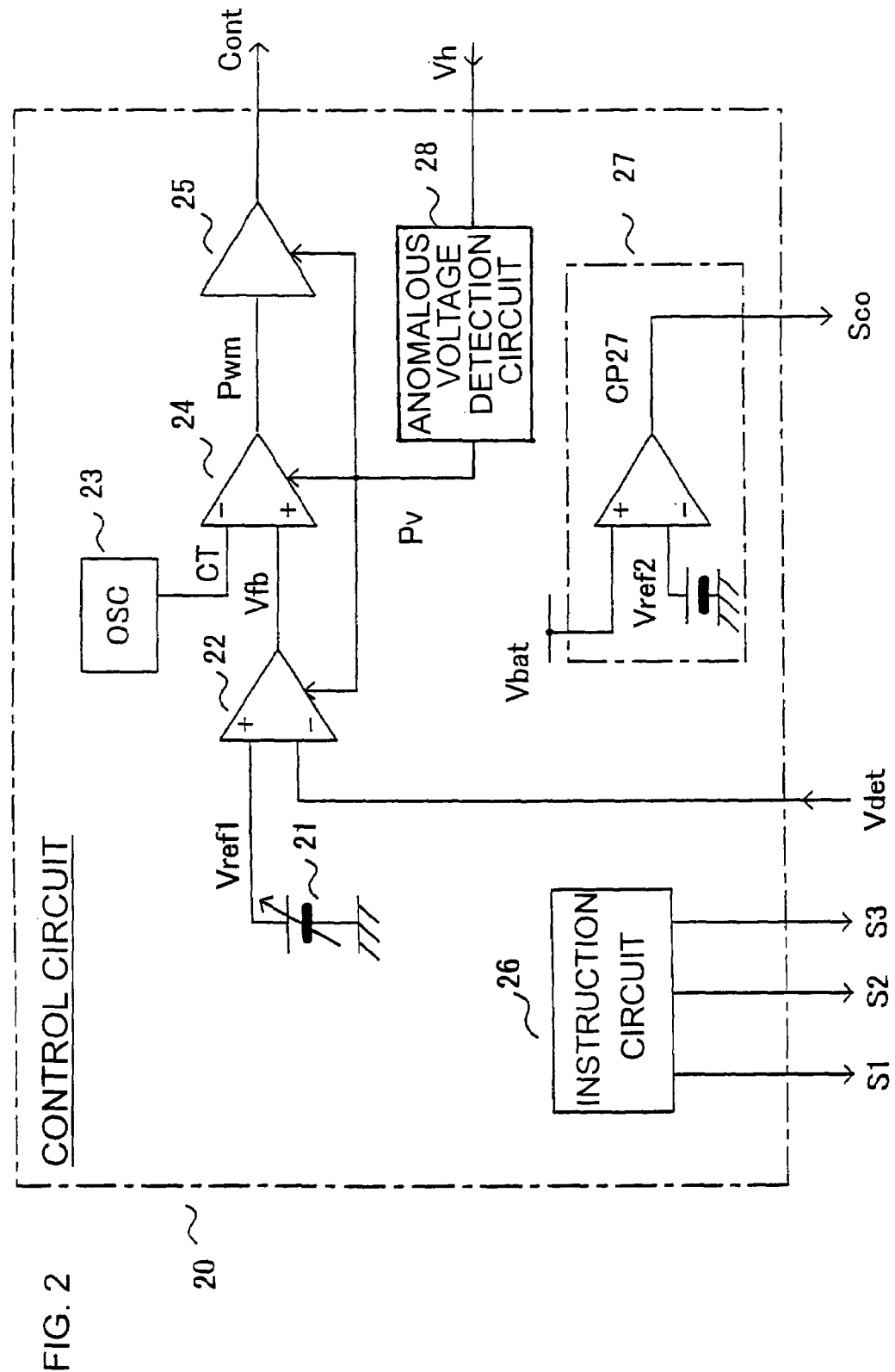
FIG. 2 is block diagram of a control circuit for use in the light emitting element driving device of FIG. 1.

An exemplary structure of the control circuit 20 of the light emission control IC 100 is shown in FIG. 2. As seen in FIG. 2, a first reference voltage Vref1 generated by a reference voltage generation circuit 21 and a detection voltage Vdet are input to an error amplifier 22, which outputs an error voltage Vfb in accord with the difference between the two inputs. The detection voltage Vdet will be described in detail later.

An oscillator 23 generates a triangular wave signal (including saw-tooth wave signal) CT for use in pulse width modulation (PWM). The triangular wave signal CT has a high frequency of the order of 1.3 MHz. A PWM comparator 24 compares the triangular wave signal CT with the error voltage Vfb, and generates a PWM signal Pwm whose duty ratio increases in accord with the increase of the error voltage Vfb. This PWM signal Pwm is supplied to the switch Qo as the control signal Cont via a pre-driver 25.

An instruction circuit 26 generates the first through third instruction signals S1–S3, which are control signals (referred to as light emission control signals) for individually controlling on/off operations of, and the magnitudes of currents through, the first through third drivers 11–13 (or currents through first through third LEDs 301–303). Thus, the amounts of light emitted from the LEDs 301–303 can be controlled by regulating the first through third instruction signals S1–S3.

A switching signal generation circuit 27 compares the power supply voltage Vbat with a predetermined voltage (second reference voltage) Vref2 by a comparator CP27 to generate a voltage switching signal Sco when the power supply voltage Vbat is higher than the voltage Vref2. The voltage Vref2 is set to a level (for example 3.2 V) necessary to energize the LED 301 for emission of light.

An anomalous voltage detector circuit 28 generates an anomaly detection signal Pv when the step-up voltage Vh has exceeded the upper limit or dropped below the lower limit of the allowable range of the driving voltage. The anomaly detection signal Pv is generated when, for example, circuit malfunction such as breaking of wires in the step-up circuit 200 or when disconnection with the display 300 has occurred (at points F1 and F2 of FIG. 1 for example). If an anomaly detection signal Pv is generated, the error amplifier 22, PWM comparator 24, and pre-driver 25, etc. are disabled to prevent an anomalously high voltage from being generated in the circuit.

Referring again to FIG. 1, it is shown that the red LED 301 of the display 300 is supplied with the power supply voltage Vbat via a switch SW1 or the step-up voltage Vh via a switch SW2. The switch SW1 and SW2 constitute a voltage switch circuit adapted to turn either one of the switches SW1 and SW2 on in response to the voltage switching signal Sco, so that the voltage provided at the output end thereof is fed to the red LED 301 as the driving voltage therefor. The driving voltage of the red LED 301 is equal to the sum (3.3 V in the example shown herein) of the voltage drops across the red LED 301 (2.8 V for example) and the first driver (0.5 V for example).

As a consequence, when the power supply voltage Vbat is larger than the required driving voltage of red LED 301, the voltage switching signal Sco of a high (H) level turns on the switch SW1 to supply the power supply voltage Vbat to the LED 301. On the other hand, if the power supply voltage Vbat is less than the required driving voltage of the red LED 301, the voltage switching signal Sco is pulled down to a low (L) level, causing the switch SW2 to be turned on to provide the step-up voltage Vh as the driving voltage for the red LED 301.

In this way, when the battery BAT is fully charged and has a sufficiently large power supply voltage Vbat, the red LED 301 is driven by the power supply voltage Vbat. Then, the first driver 11 can efficiently drive the LED, since the first driver 11 results in little power loss. As the power supply voltage Vbat of the battery BAT has fallen below the required driving voltage of the red LED 301 in the course of discharging its energy, the source of power for the red LED 301 will be automatically switched to the step-up circuit providing the step-up voltage Vh.

Thus, unlike in conventional light emitting element driving devices, the usability of the battery BAT is not limited by the lower limit of the operating voltage (2.8 V for example) of the red LED. That is, if the battery voltage Vbat has lowered below the lower limit, the battery can be still used to drive the red LED, though suffering a greater power loss. This permits effective exploitation of the battery energy over an extended period.

It should be noted that each of the drivers 11–13 can perform constant-current operation so long as the voltage V11–V13 impressed on the transistor Q12 on the output end of the respective drivers 11–13 (as shown in FIG. 3) is equal to or larger than the saturation voltage (about 0.3 V) of the transistor Q12, and that the portion of the voltage that exceeds the saturation voltage of the transistor Q12 plus some marginal voltage α (in total of about 0.3 V+α=0.5 V) results in an unnecessary power loss (i.e. current×voltage) inside the drivers 11–13.

In order to minimize the power losses in the respective drivers 11–13, it is desirable to supply the error amplifier 22 with the detection voltage Vdet that equals the lowest one of the permissible operating voltages V11–13.

Figure 4:
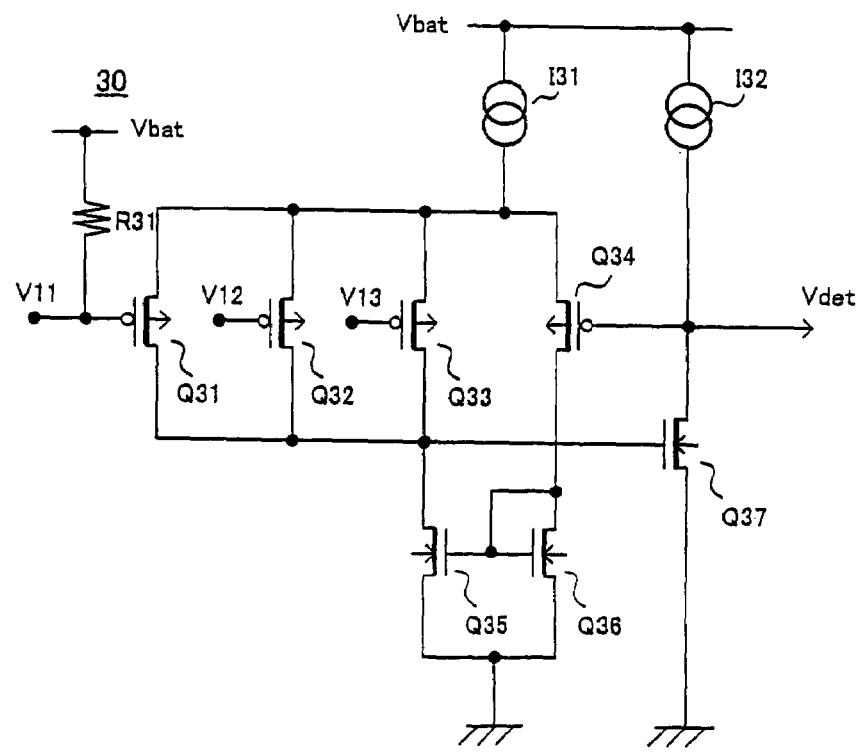
FIG. 4 is schematic diagram of a selection circuit for use in the light emitting element driving device of FIG. 1.

FIG. 4 shows an exemplary structure of a selection circuit 30 for selecting an adequate detection voltage Vdet. As shown in FIG. 4, P-type MOS transistors (hereinafter referred to as P-type transistors) Q31, Q32, and Q33 are connected in parallel with each other, with their gates respectively coupled to the voltages V11, V12, and V13 that are impressed on the constant current drivers 11, 12, and 13. The P-type transistor Q33 is connected in series with an N-type transistor Q35. They are further connected between the power supply voltage Vbat and the ground via a constant current generator I31. The P-type transistor Q34 is connected in series with another N-type transistor Q36. They are also connected between the power supply voltage Vbat and the ground via the constant current generator I31. The gates of the N-type transistors Q35 and Q36 are connected together and further connected to the drain of the N-type transistor Q36.

Also connected in series between the power supply voltage Vbat and the ground are a further N-type transistor Q37 and a constant current generator I32. The node of the N-type transistor Q37 and the constant current generator I32 is connected to the gate of the P-type transistor Q34 to extract therefrom the detection voltage Vdet. The gate of the N-type transistor Q37 is connected to the drain of the N-type transistor Q35.

The selection circuit 30 of FIG. 4 is adapted to select the lowest one of the voltages V11, V12, and V13 and provide the selected voltage as the detection voltage Vdet via a voltage follower that utilizes an operational amplifier. Thus, the lowest voltage can be implemented in a stable manner as the detection voltage Vdet.

However, whether the voltage V11 needs be input to the selection circuit 30 or not depends on which of the switches SW1 and SW2 is selected, and if needed, the voltage V11 is selected by a switch SW11 of the voltage switch circuit. These switches SW1, SW2, and SW11 can be transistor switches.

When the red LED 301 is driven by the power supply voltage Vbat, the voltage V11 must not be selected as the detection voltage Vdet to control the step-up voltage Vh. In order not to do so, the switch SW11 and the switch SW2 are operatively toggled and controlled by the voltage switching signal Sco such that they are turned on or off together. In addition, in order to avoid the gate voltage of the P-type transistor Q31 from indeterminate, it is preferred to be pulled up to the power supply voltage Vbat by a highly resistive resistor R31 or by a switch.

In the example shown herein, the battery voltage Vbat is used as the power supply voltage to the driver 11 and to the selection circuit 30. In actuality, however, it is preferable to form, from the battery voltage Vbat, a stable control supply voltage to the driver 11 and the selection circuit 30.

Operation of an inventive light emitting element driving device for providing such stable voltage supply will now be described with reference to the drawings.

When the battery BAT is fully charged, the power supply voltage Vbat is higher than the nominal operating voltage of the red LED, and the voltage switching signal Sco has H level, causing the switch SW1 to be turned on. Thus, the red LED 301 is driven by the power supply voltage Vbat, while the green LED 302 and the blue LED 303 are driven by the step-up voltage Vh.

On the other hand, the drivers 11–13 operate to flow currents of magnitudes Ir, Ig, and Ib as instructed by the instruction signals S1–S3. Each of the LEDs 301–303 emits an amount of light in accordance with the respective current Ir, Ig, or Ib.

Since the switch SW11 is turned off under this condition, only the voltages V12 and V13 are input to the selection circuit 30, so that the lower one of the voltages V12 and V13 is supplied to the error amplifier 22 as the detection voltage Vdet. As a consequence, the step-up voltage Vh is boosted to the level for which the detection voltage Vdet equals the first reference voltage Vref1.

Thus, when the power supply voltage Vbat is sufficiently high, the red LED 301 (resulting in a small voltage drop) is driven by the battery voltage Vbat. Under this condition, the voltage V11 remains low irrespective of the magnitude of the step-up voltage Vh and hence the energy loss in the driver 11 remains minimum.

As the battery voltage Vbat falls below the second predetermined voltage Vref2, the voltage switching signal Sco is pulled down to L level, turning off the switch SW1 and turning on the switches SW2 and SW11.

This causes all of the LEDs 301–303 to be driven by the step-up voltage Vh. Then the drivers 11–13 maintains currents of magnitudes Ir, Ig, and Ib as instructed by the instruction signals S1–S3, independently of the change in the driving voltage, thereby allowing the LEDs 301–303 to emit light in accord with the currents Ir, Ig, and Ib.

Since the switch SW11 is now turned on, all of the voltages V11, V12, and V13 are input to the selection circuit 30, and the lowest one of the voltages V11–13 is supplied to the error amplifier 22 as the detection voltage Vdet. Therefore, the step-up voltage Vh is boosted to equilibrate the detection voltage Vdet with the first reference voltage Vref1.

In this manner, when the power supply voltage Vbat falls below the second reference voltage Vref2, all the LED groups (of red, green, blue LEDs) are automatically driven by the step-up voltage Vh. This extends the range of usable battery voltage from a minimum of 2.5 V for example to a maximum of fully charged voltage of 4.2 V for example, which is wider than the conventional range. Thus, usable time of a portable apparatus can be extended accordingly.

It should be appreciated that, since the lowest one of the voltages V11–V13 impressed on the constant current drivers 11–13 is selected as the detection voltage, the LEDs are driven by the lowest permissible step-up voltage Vh with the least power loss. This is the case particularly when only the red LED 301 requiring a low driving voltage is driven.

Although the invention has been described in detail above with a particular reference to a display that includes only one red LED, one green LED, and one blue LED in connection with FIG. 1, it will be apparent to those skilled in the art that the invention can be applied to other displays that include two or more than two groups of light emitting elements operable at different voltages. The invention may be modified to incorporate different numbers and arrangements of linearly, parallelly, and linearly as well as parallelly connected light emitting elements in accordance with the area to be illuminated and the amount of light required.

For example, given two red LEDs, two green LEDs, and two blue LEDs, the two red LEDs may be connected in parallel while the two green LEDs, and the two blue LEDs as well, may be connected in series. It will be understood that the LEDs can be of the same color (including white). As another example, the invention may be applied to two groups of LEDs with one group having only one light emitting element and another group having two light emitting elements.

What is claimed is:

1. A light emitting element driving device, comprising:
   a step-up circuit for stepping up a given power supply voltage to generate a required step-up voltage at an output end of said step-up circuit (said output end referred to as step-up voltage output end);
   a voltage switch circuit for selectively outputting said power supply voltage or step-up voltage at a switched voltage output end of said voltage switch circuit;
   a first driver connected in series with a first light emitting element group and connected between said switched voltage output end and a reference voltage node, said first driver controlled by a first instruction signal; and
   a second driver connected in series with a second light emitting element group that results in a larger voltage drop than said first group and connected between said step-up voltage output end and said reference voltage node, said second driver controlled by a second instruction signal.

2. The light emitting element driving device according to claim 1, further comprising a third driver connected in series with a third light emitting element group that results in a larger voltage drop than said first group, and connected between said step-up voltage output end and said reference voltage node, said third driver controlled by a third instruction signal.

3. The light emitting element driving device according to claim 2, wherein said voltage switch circuit is automatically switched to output said power supply voltage when said power supply voltage exceeds a predetermined level but output said step-up voltage when said power supply voltage is less than said predetermined level.

4. The light emitting element driving device according to claim 3, wherein each of said first through third drivers is a constant current driver that is turned on/off by said first through third instruction signals, respectively, to provide constant current.

5. The light emitting element driving device according to claim 4, further comprising a selection circuit adapted to receive at all times the voltages that are impressed on said second and third drivers but receive the voltage that is impressed on said first driver only when said stepped up voltage is output from said voltage switch circuit, said selection circuit further adapted to selectively output as a detection voltage the lowest voltage received, whereby said step-up voltage generated by said step-up circuit is controlled so that said detection voltage becomes equal to said reference voltage.

6. The light emitting element driving device according to claim 2, wherein said first, second, and third light emitting element groups are groups of red, green, and blue LEDs, respectively.

7. The light emitting element driving device according to claim 6, wherein said voltage switch circuit is automatically switched to output said power supply voltage when said power supply voltage exceeds a predetermined level but output said step-up voltage when said power supply voltage is less than said predetermined level.

8. The light emitting element driving device according to claim 7, wherein each of said first through third drivers is a constant current driver that is turned on/off by said first through third instruction signals, respectively, to provide constant current.

9. The light emitting element driving device according to claim 8, further comprising a selection circuit adapted to receive at all times the voltages that are impressed on said second and third drivers but receive the voltage that is impressed on said first driver only when said stepped up voltage is output from said voltage switch circuit, said selection circuit further adapted to selectively output as a detection voltage the lowest voltage received, whereby said step-up voltage generated by said step-up circuit is controlled so that said detection voltage becomes equal to said reference voltage.

10. A portable apparatus equipped with light emitting elements, said apparatus comprising:
   a battery for providing a power supply voltage;
   a first light emitting element group including LED of a first predetermined color;
   a second light emitting element group including LED of a second predetermined color and resulting in a larger voltage drop than said first group;
   a step-up circuit for stepping up said power supply voltage to generate at a step-up voltage output end thereof a predetermined step-up voltage;
   a voltage switch circuit for selectively outputting one of said power supply voltage and said step-up voltage at a switched voltage output end of said voltage switch circuit;
   a first driver connected in series with said first light emitting element group and connected, together with said first group, between said switched voltage output end and a reference voltage node, said first driver controlled by a first instruction signal; and
   a second driver connected in series with said second light emitting element group and connected, together with said second group, between said step-up voltage output end and said reference voltage node, said second driver controlled by a second instruction signal.

11. The portable apparatus according to claim 10, wherein said first driver has a driver circuit for red light emitting element while said second driver has a driver circuit for green light emitting element and a driver circuit for blue light emitting element.

12. The portable apparatus according to claim 10, wherein said voltage switch circuit is automatically switched to output said power supply voltage when said power supply voltage exceeds a predetermined level but output said step-up voltage when said power supply voltage is less than said predetermined level.

13. The portable apparatus according to claim 12, wherein said first driver has a driver circuit for red light emitting element while said second driver has a driver circuit for green light emitting element and a driver circuit for blue light emitting element.

14. The portable apparatus according to claim 12, wherein each of said first and second drivers is a constant current driver that is turned on/off by said first and second instruction signals, respectively, to provide constant current.

15. The portable apparatus according to claim 14, wherein said first driver has a driver circuit for red light emitting element while said second driver has a driver circuit for green light emitting element and a driver circuit for blue light emitting element.

16. The portable apparatus according to claim 14, further comprising a selection circuit adapted to receive at all times the voltage that is impressed on said second driver but receive the voltage that is impressed on said first driver only when said stepped up voltage is output from said voltage switch circuit, said selection circuit further adapted to selectively output as a detection voltage the lowest voltage received, whereby said step-up voltage generated by said step-up circuit is controlled so that said detection voltage becomes equal to said reference voltage.

17. The portable apparatus according to claim 16, wherein said first driver has a driver circuit for red light emitting element while said second driver has a driver circuit for green light emitting element and a driver circuit for blue light emitting element.

* * * * *